US009864359B2

(12) United States Patent
Yamashita et al.

(10) Patent No.: US 9,864,359 B2
(45) Date of Patent: Jan. 9, 2018

(54) NUMERICAL CONTROL DEVICE

(71) Applicant: Mitsubishi Electric Corporation, Tokyo (JP)

(72) Inventors: Ryosuke Yamashita, Tokyo (JP); Nobuyuki Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 268 days.

(21) Appl. No.: 14/762,318

(22) PCT Filed: Apr. 5, 2013

(86) PCT No.: PCT/JP2013/060513
§ 371 (c)(1),
(2) Date: Jul. 21, 2015

(87) PCT Pub. No.: WO2014/162598
PCT Pub. Date: Oct. 9, 2014

(65) Prior Publication Data
US 2015/0378344 A1    Dec. 31, 2015

(51) Int. Cl.
*G05B 19/19*     (2006.01)
*G05B 19/4155*   (2006.01)

(52) U.S. Cl.
CPC ......... *G05B 19/19* (2013.01); *G05B 19/4155* (2013.01); *G05B 2219/34286* (2013.01)

(58) Field of Classification Search
None
See application file for complete search history.

(56) References Cited

U.S. PATENT DOCUMENTS 4,281,379 A * 7/1981 Austin ............... G05B 19/4093
                                                     318/569
5,428,547 A * 6/1995 Ikeda ................. G05B 19/4184
                                                     700/174

(Continued)

FOREIGN PATENT DOCUMENTS

JP    61-004637 A    1/1986
JP    61-175303 A    10/1986

(Continued)

OTHER PUBLICATIONS

International Search Report for PCT/JP2013/060513 dated Jul. 2, 2013.

*Primary Examiner* — Jason Lin
(74) *Attorney, Agent, or Firm* — Sughrue Mion, PLLC; Richard C. Turner

(57) ABSTRACT

A numerical control device includes at least an operation-pattern storage unit that stores operation patterns each including commands for causing operations by a peripheral device to be executed, the commands using a shaft configuration of the peripheral device, a unique M code, or a moving amount of the peripheral device as variables, a machine-information storage unit that stores machine information in which a value with respect to each of the variables is specified for a shaft of the peripheral device or for the unique M code, and a program analysis unit that when a command in a received numerical control program is a command for the peripheral device, acquires an operation pattern corresponding to an argument indicating the operation pattern and delivers the operation pattern to a peripheral-device operation generation unit together with a moving amount indicated by an argument indicating the moving amount of the peripheral device.

6 Claims, 9 Drawing Sheets

(56) References Cited

U.S. PATENT DOCUMENTS

| | | | | |
|---|---|---|---|---|
| 6,584,415 | B1 * | 6/2003 | Uneme | G05B 19/4065 |
| | | | | 702/33 |
| 6,728,657 | B2 | 4/2004 | Nakamura | |
| 6,970,764 | B2 * | 11/2005 | Harada | G05B 19/4093 |
| | | | | 318/568.1 |
| 7,167,772 | B2 * | 1/2007 | Hioki | G05B 19/4103 |
| | | | | 318/568.1 |
| 8,090,463 | B2 * | 1/2012 | Kaever | G05B 23/0264 |
| | | | | 700/108 |
| 8,521,322 | B2 * | 8/2013 | Maeda | G05B 19/40931 |
| | | | | 700/184 |
| 8,843,230 | B2 * | 9/2014 | Mizuno | G05B 19/41865 |
| | | | | 318/568.17 |
| 2005/0163022 | A1 * | 7/2005 | Kawasaki | G05B 19/19 |
| | | | | 369/178.01 |

FOREIGN PATENT DOCUMENTS

| | | |
|---|---|---|
| JP | 02-218504 A | 8/1990 |
| JP | 03-136109 A | 6/1991 |
| JP | 2003-022106 A | 1/2003 |
| JP | 2003-175439 A | 6/2003 |

* cited by examiner

FIG.3

G305 L(OPERATION) K(MOVING AMOUNT)

G305 L1 K100

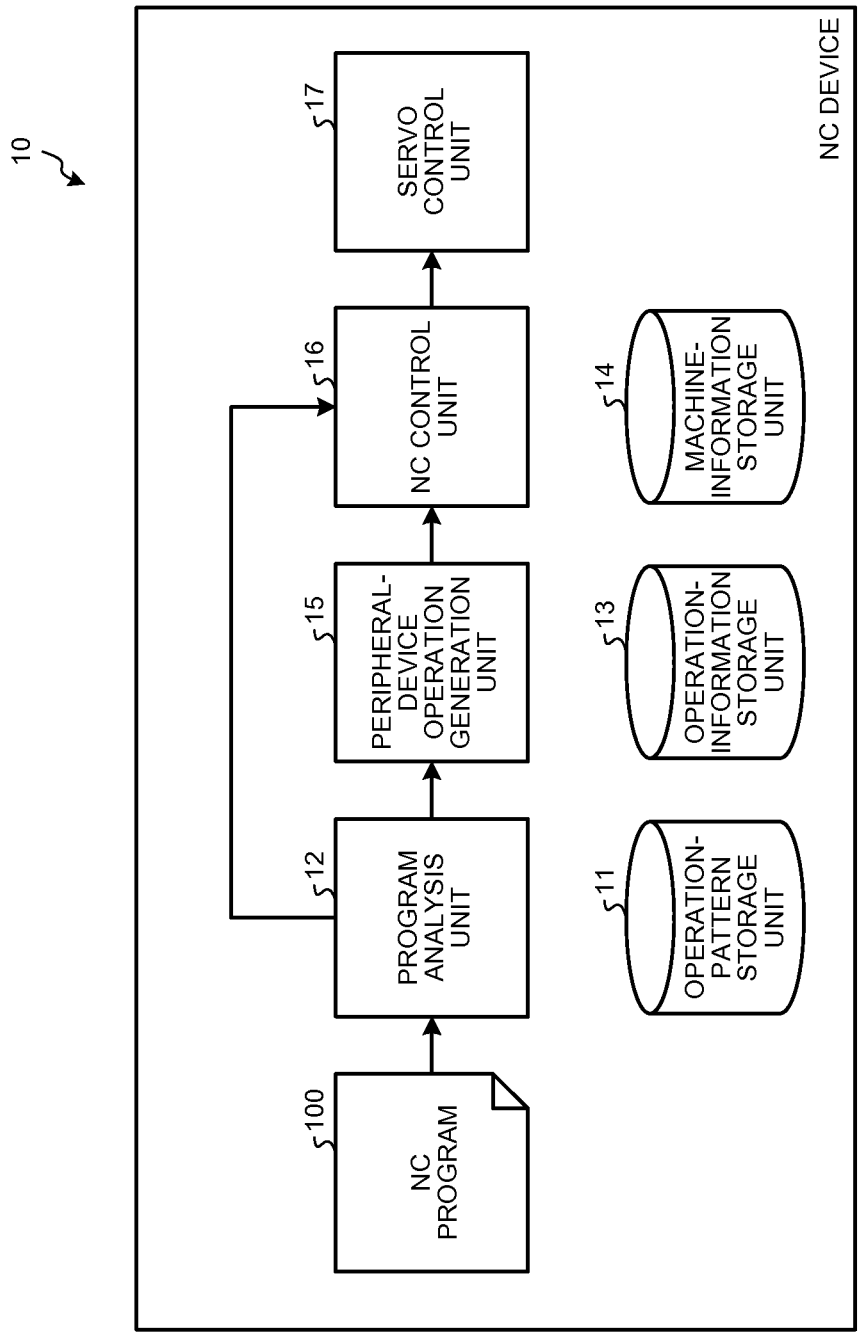

FIG.5

| OPERA-TION | OPERATION PATTERN |
|---|---|
| 1 | ·IF ((INTERFERENCE DETERMINATION)<br>·G90G0X[RETRACT POSITION X]Y[RETRACT POSITION Y]Z[RETRACT POSITION Z](RETRACT TOOL REST)<br>·M5M9 (TAILSTOCK OPERATION PREPARATION COMMAND)<br>·G90G0[SHAFT NAME OF PERIPHERAL DEVICE][[MOVING AMOUNT]-[PRESSING AMOUNT]]<br>(TAILSTOCK MOVE COMMAND)<br>·IF ((PRESSING DETERMINATION)<br>·G31[SHAFT NAME OF PERIPHERAL DEVICE][PRESSING AMOUNT]M[THRUST (HIGH)]M[THRUST ON]<br>F(TAILSTOCK PRESSING-OPERATION COMMAND) |
| 2 | ·IF ((INTERFERENCE DETERMINATION)<br>·G90G0X[RETRACT POSITION X]Y[RETRACT POSITION Y]Z[RETRACT POSITION Z](RETRACT TOOL REST)<br>·M5M9 (STEADY-REST OPERATION PREPARATION COMMAND)<br>·M[STEADY-REST ARM OPENING COMMAND] (STEADY-REST ARM OPENING COMMAND)<br>·G90G0[SHAFT NAME OF PERIPHERAL DEVICE][MOVING AMOUNT] (STEADY-REST MOVE COMMAND)<br>·M[STEADY-REST ARM CLOSING COMMAND] (STEADY-REST ARM CLOSING COMMAND) |
| 3 | ... |
| 4 | ... |
| 5 | ... |

FIG.6

| CONTENTS (VARIABLE NAMES) | VALUE |
|---|---|
| RETRACT POSITION X | 100. |
| RETRACT POSITION Y | 0. |
| RETRACT POSITION Z | 100. |
| PRESSING AMOUNT | 1. |
| PRESSING SPEED | 100. |

FIG.7

| CONTENTS (VARIABLE NAMES) | VALUE |
|---|---|
| SHAFT NAME OF PERIPHERAL DEVICE | W |
| THRUST (HIGH) | 831 |
| THRUST (LOW) | 832 |
| THRUST ON | 504 |
| TAIL BLOW ON | 272 |
| ... | ... |
| STEADY-REST ARM OPENING | 292 |
| STEADY-REST ARM CLOSING | 293 |
| ... | ... |

NUMERICAL CONTROL DEVICE

CROSS REFERENCE TO RELATED APPLICATIONS

This application is a National Stage of International Application No. PCT/JP2013/060513 filed Apr. 5, 2013, the contents of all of which are incorporated herein by reference in their entirety.

FIELD

The present invention relates to a numerical control device.

BACKGROUND

As a drive control method performed in a case where a steady rest is used in a numerical control (hereinafter, "NC") device, a method in which whether a workpiece being machined has a length equal to or larger than a predetermined length is determined, and if the workpiece has the predetermined or larger length, the steady rest is positioned to support a flat portion of the workpiece (see, for example, Patent Literature 1) has been proposed. A program command according to ISO (International Organization for Standardization)/EIA (Electronic Industries Alliance) is used as a command directed to a peripheral device such as a tailstock or the steady rest provided in such an NC machine tool.

The commands to the peripheral device according to the ISO/EIA program include a command for moving the position and a command for performing the operation. When the position is to be moved, a move command is issued to a "shaft name" given to a drive motor of the corresponding peripheral device. When a peripheral device is to be operated, a command by means of an auxiliary command (hereinafter, "M code") is issued.

CITATION LIST

Patent Literature

Patent Literature 1: Japanese Patent Application Laid-open No. S61-4637

SUMMARY

Technical Problem

However, the shaft name given to a drive motor for the peripheral devices is generally different for each machine configuration. For example, in a machine configuration with a tailstock, the shaft name given to a drive motor of the tailstock is arbitrarily set by a user. Further, M codes commanded on an NC program have different specifications according to each machine tool manufacturer and each NC manufacturer, except for representative codes. Therefore, even if it is desired to cause the peripheral devices perform the same operations, there are cases in which the same program command cannot be used.

As described above, in order to control peripheral devices, the NC device needs to recognize the shaft name and the M code different for each machine configuration to issue a command on the ISO/EIA program, which makes diversion of the program difficult. This leads to an increase of the program creation time. It is also difficult for a beginner to determine a sequence order of the move command and the M code command and the timing thereof to perform programming of ISO/EIA standards.

The present invention has been achieved in view of the above problems, and an object of the present invention is, in an NC control device that controls a machine tool equipped with peripheral devices, to provide an NC control device that can perform programing of the commands for peripheral devices easily, without depending on a shaft name of each peripheral device or M codes that are different for each machine tool manufacturer and each NC manufacturer.

Solution to Problem

In order to solve the aforementioned problems, a numerical control device that controls a machine tool and a peripheral device to be placed around the machine tool according to a numerical control program is constructed to include: an operation-pattern storage unit that stores operation patterns each including commands for causing operations by the peripheral device to be executed, the commands using configuration of a shaft of the peripheral device, M code unique to the numerical control device, or moving amount of the peripheral device as variables; a machine-information storage unit that stores machine information in which a value with respect to each of the variables is specified for the shaft of the peripheral device or for the unique M code; a program analysis unit that receives the numerical control program, and when a command in the numerical control program is a command for the machine tool, delivers the command to a numerical control unit, and when the command is a command for the peripheral device including a first argument indicating an operation pattern stored in the operation-pattern storage unit and a second argument indicating a moving amount of the peripheral device, acquires the operation pattern corresponding to the first argument from the operation-pattern storage unit, and delivers the operation pattern to a peripheral-device operation generation unit together with the moving amount indicated by the second argument; the peripheral-device operation generation unit that generates a peripheral device command by substituting the corresponding machine information or the acquired moving amount for each of the variables in the commands constituting the acquired operation pattern; and the numerical control unit that generates a move command with respect to the machine tool or the shaft constituting the peripheral device from a command in the numerical control program or the peripheral device command.

Advantageous Effects of Invention

According to the present invention, only by designating two arguments of "operation" and "moving amount" in control of a relevant peripheral device, a command for a peripheral device (hereinafter may be referred to just as a "peripheral device command") is generated according to an operation pattern stored in an operation-pattern storage unit. Therefore, there is an effect that a program can be easily created and the peripheral device can be easily controlled by a user without paying attention to a shaft name, an M code, or a command sequence, which are conventionally programmed by the user himself.

BRIEF DESCRIPTION OF DRAWINGS

FIG. 3 is a diagram illustrating an example of a command code to a peripheral device.

FIG. 4 is a block diagram schematically illustrating a functional configuration of an NC device according to an embodiment of the present invention.

FIG. 5 is a diagram illustrating an example of operation pattern information.

FIG. 6 is a diagram illustrating an example of operation information.

FIG. 7 is a diagram illustrating an example of machine information.

FIG. 12 is a diagram illustrating a peripheral device command for the NC device including the steady rest.

DESCRIPTION OF EMBODIMENTS

Exemplary embodiments of a numerical control device according to the present invention will be explained below in detail with reference to the accompanying drawings. The present invention is not limited to the embodiments.

Figure 1:
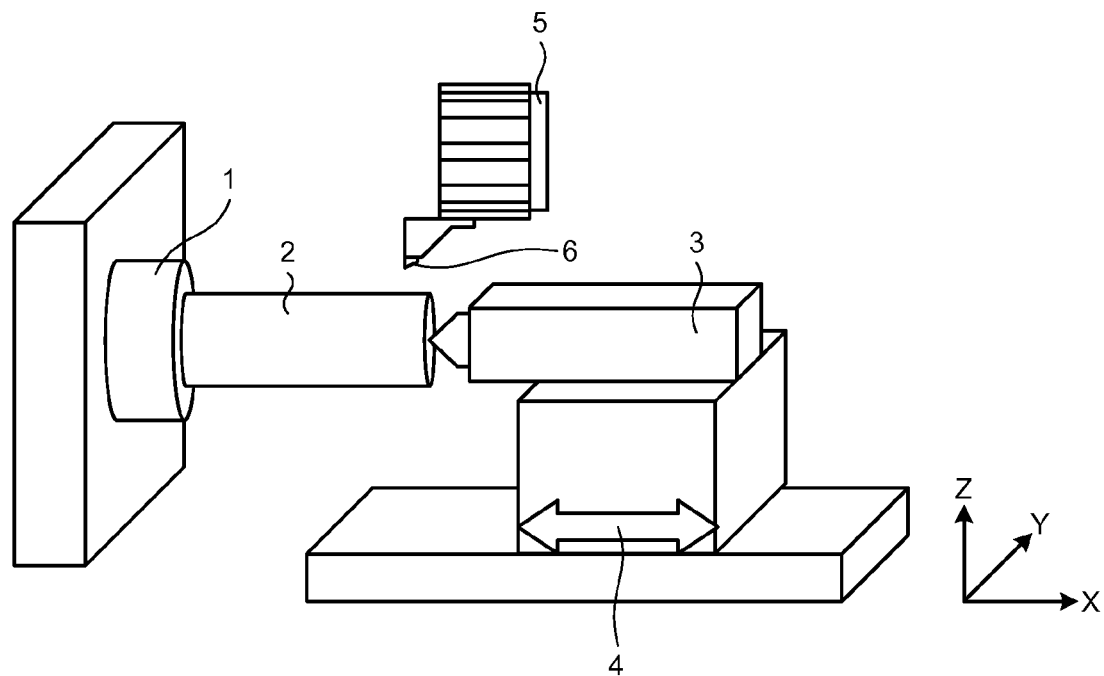
FIG. 1 is a perspective view schematically illustrating an example of a configuration of an NC machine tool including a tailstock.
Figure 2:
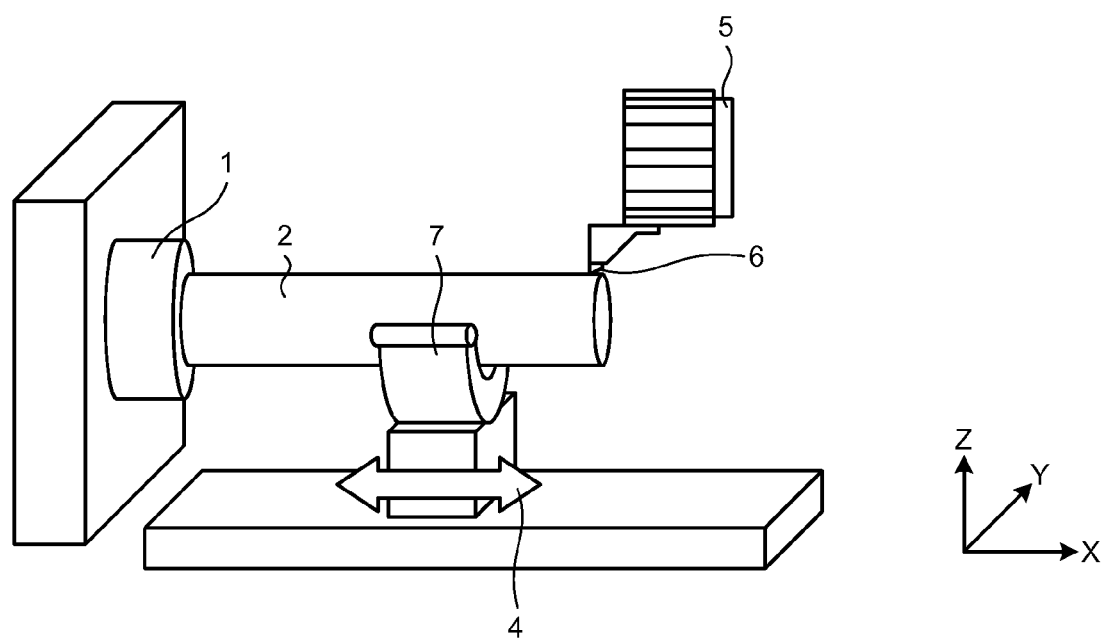
FIG. 2 is a perspective view schematically illustrating an example of a configuration of an NC machine tool including a steady rest.

FIG. 1 is a perspective view schematically illustrating an example of a configuration of an NC machine tool equipped with a tailstock. FIG. 2 is a perspective view schematically illustrating an example of a configuration of an NC machine tool equipped with a steady rest. In these drawings, it is assumed that the direction of a spindle is an X direction, the height direction is a Z direction, and a direction perpendicular to both the X direction and the Z direction is a Y direction.

As illustrated in FIG. 1, the NC machine tool equipped with a tailstock includes a spindle 1 that is fixed at a predetermined height and holds an end on the X negative-direction side of a workpiece 2 extending in the X direction, a tailstock 3 provided at an end on the X positive-direction side of the workpiece 2, a shaft 4 that supports the tailstock 3 and is capable of being driven in the X direction, and a tool rest 5 to which a machining tool 6 is attached for performing machining on the workpiece 2.

In the NC machine tool equipped with the tailstock, an end face in the X positive-direction side of the workpiece 2 mounted on the spindle 1 is pressed by an end portion of the tailstock 3 placed on the shaft 4 drivable in the X direction, thereby fixing the workpiece 2. In a state where the workpiece 2 is fixed, the tool 6 attached to the tool rest 5, the workpiece 2 supported by the spindle 1, and the tailstock 3 are operated according to a program to perform machining of the workpiece 2.

Further, as illustrated in FIG. 2, the NC machine tool equipped with a steady rest includes the spindle 1 that is fixed at a predetermined height and holds an end on the X negative-direction side of the workpiece 2 extending in the X direction, a steady rest 7 provided to support a part of the side face of the workpiece 2 on the Z negative-direction side, the shaft 4 that supports the steady rest 7 and is capable of being driven in the X direction, and the tool rest 5 to which the tool 6 is attached to perform machining on the workpiece 2.

In the NC machine tool equipped the steady rest, a part of the side face on the Z negative-direction side of the workpiece 2 mounted on the spindle 1 is supported from underneath by the steady rest 7, and the tool 6 attached to the tool rest 5, the workpiece 2 supported by the spindle 1, and the steady rest 7 are operated according to a program to perform machining of the workpiece 2.

These machine tools are controlled by an NC device based on a program. According to the present embodiment, a command code indicating that a command is directed to a peripheral device is determined beforehand. FIG. 3 is a diagram illustrating an example of the command code to a peripheral device. As illustrated in the first line in FIG. 3, which is a format example, "G305" is defined as a command code for the peripheral device, and an argument L indicating an operation and an argument K indicating a moving amount are set in the command code. The "operation" designates a program in which an operation performed by the peripheral device is specified, and the "moving amount" designates a moving amount of the peripheral device. The second line in FIG. 3 illustrates a practical program example. The example indicates that a command for the peripheral device is created by using a program designated by "1" contained in the argument indicating the operation and assuming "100" contained in the argument indicating the moving amount as the moving amount. The command code to the peripheral device is not limited to "G305", and addresses "L" and "K" attached to the command are not limited to these characters either.

FIG. 4 is a block diagram schematically illustrating a functional configuration of the NC device according to the present embodiment. An NC device 10 includes an operation-pattern storage unit 11, a program analysis unit 12, an operation-information storage unit 13, a machine-information storage unit 14, a peripheral-device operation generation unit 15, an NC control unit 16, and a servo control unit 17.

The operation-pattern storage unit 11 stores therein operation pattern information including operation patterns in each of which an operation of a peripheral device is specified by a plurality of commands. The operation pattern information is composed of operation patterns each including command codes for a peripheral device in an NC program 100 and identification numbers which are assigned when used at the time of designating each of the operation patterns. FIG. 5 is a diagram illustrating an example of the operation pattern information. In this example, the "operation" corresponds to an identifier. An operation pattern related to a pressing operation of the tailstock is contained in operation "1", and an operation pattern related to a support operation using the steady rest is contained in operation "2".

Each of the operation patterns is configured by plural commands. Variables are allocated to the portions in each of the commands that vary according to the machine configuration of each NC machine tool. The variable portions each include, for example, an M code set by a user, a position corresponding to the NC machine tool, or a shaft name given to the shaft. In the example in FIG. 5, a variable name is described in a portion enclosed by a square bracket ([ ]) in the commands. The operation patterns can be changed or added arbitrarily by the user.

The program analysis unit 12 reads and analyzes the NC program 100 and determines whether a command is for controlling a peripheral device. When the command is not for a peripheral device, the program analysis unit 12 transmits the command to the NC control unit 16. When the command is for a peripheral device, the program analysis unit 12 acquires an operation pattern corresponding to an argument related to the operation in the command for the peripheral device from the operation-pattern storage unit 11 and acquires an argument related to the moving amount in the command, and transmits these arguments to the peripheral-device operation generation unit 15.

The operation-information storage unit 13 stores therein operation information that specifies an operation of the peripheral device or the tool rest in each of the commands in the operation patterns. FIG. 6 is a diagram illustrating an example of the operation information, wherein a value is specified with respect to each content (a variable name). Contents (variable names) correspond to the variable names in the command codes for the peripheral devices. In FIG. 6, a retraction position of the tool rest when there is an interference with the tailstock, a pressing amount and a pressing speed of the tailstock against the workpiece and the like are specified. Although not illustrated in FIG. 6, the operation of the peripheral device or the tool rest is specified in the similar manner also in the case of other peripheral devices such as the steady rest. For example, the operation information is provided for each of the operation patterns.

The machine-information storage unit 14 stores therein machine information specifying a shaft configuration of the NC machine tool and unique M codes. FIG. 7 is a diagram illustrating an example of the machine information. A value is specified with respect to each content (a variable name). In FIG. 7, the shaft name of the peripheral device is contained in the top record, and from the next record, for example, for the M codes uniquely set by a user, the contents and numerical values (values following M) are associated with each other. Although not illustrated in the drawings, as to what kind of command the unique M code indicates is separately specified.

When the operation pattern and the moving amount are delivered from the program analysis unit 12, the peripheral-device operation generation unit 15 uses the moving amount, the operation information in the operation-information storage unit 13, and the machine information in the machine-information storage unit 14 to substitute values for the variables in the operation pattern, thereby generating a peripheral device command for an intended NC machine tool. The generated peripheral device command is delivered to the NC control unit 16.

The NC control unit 16 converts the command delivered from the program analysis unit 12 and the peripheral device command to a move command of each corresponding shaft and delivers the move command to the servo control unit 17.

The servo control unit 17 generates a command to a servo amplifier based on the received move command, and drives a motor (not illustrated) of the NC machine tool.

Figure 8:
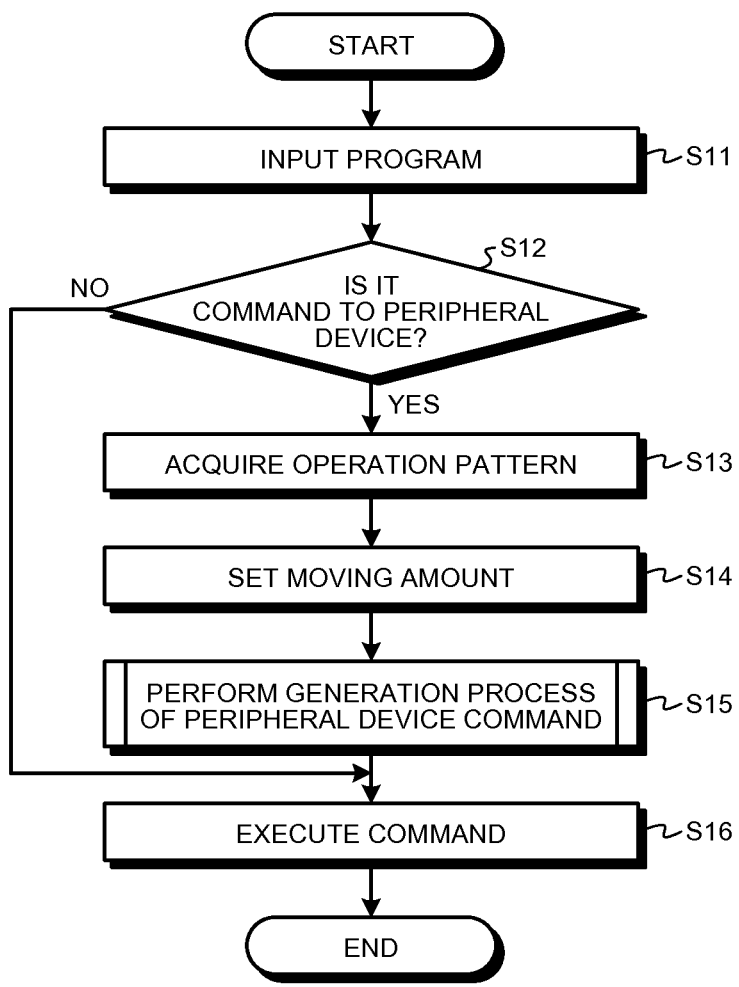
FIG. 8 is a flowchart illustrating an example of an operation process procedure according to the embodiment.

An operation process of the NC device having such a configuration is described next. FIG. 8 is a flowchart illustrating an example of an operation process procedure according to the present embodiment. When the NC program 100 is input to the program analysis unit 12 (Step S11), the program analysis unit 12 determines whether it is a command for a peripheral device (Step S12).

When it is the command to the peripheral device (YES in step S12), the program analysis unit 12 acquires from the operation-pattern storage unit 11, an operation pattern designated by the argument "operation (L)" in the command for the peripheral device in the input NC program 100 (Step S13). The program analysis unit 12 also acquires the argument "moving amount (K)" in the command for the peripheral device in the input NC program 100 (Step S14). The program analysis unit 12 transmits the acquired operation pattern and moving amount to the peripheral-device operation generation unit 15.

Next, the peripheral-device operation generation unit 15 performs a process to generate a peripheral device command (Step S15). More specifically, the peripheral-device operation generation unit 15 substitutes information acquired from the acquired moving amount, the operation information in the operation-information storage unit 13, and the machine information in the machine-information storage unit 14 for the variables in the acquired operation pattern, thereby to generate the peripheral device command.

Thereafter, or alternatively when it is not the command for the peripheral device in step S12 (NO in step S12), the NC control unit 16 executes the input command or the peripheral device command (Step S16). Specifically, the NC control unit 16 converts the received command or the peripheral device command to the move command for the corresponding shaft, and transmits the move command to the servo control unit 17. Thereafter, the servo control unit 17 generates a command for the servo amplifier and executes control by driving the motor. When it is not a command for the peripheral device in step S12, the program analysis unit 12 transmits the command to the NC control unit 16 in a usual manner. In this way, the process ends.

Specific examples of the generation process of the peripheral device command in step S15 are described below in the case of the NC device that controls the machine tool including the tailstock in FIG. 1 and in the case of the NC device that controls the machine tool including the steady rest in FIG. 2, respectively.

Figure 9:
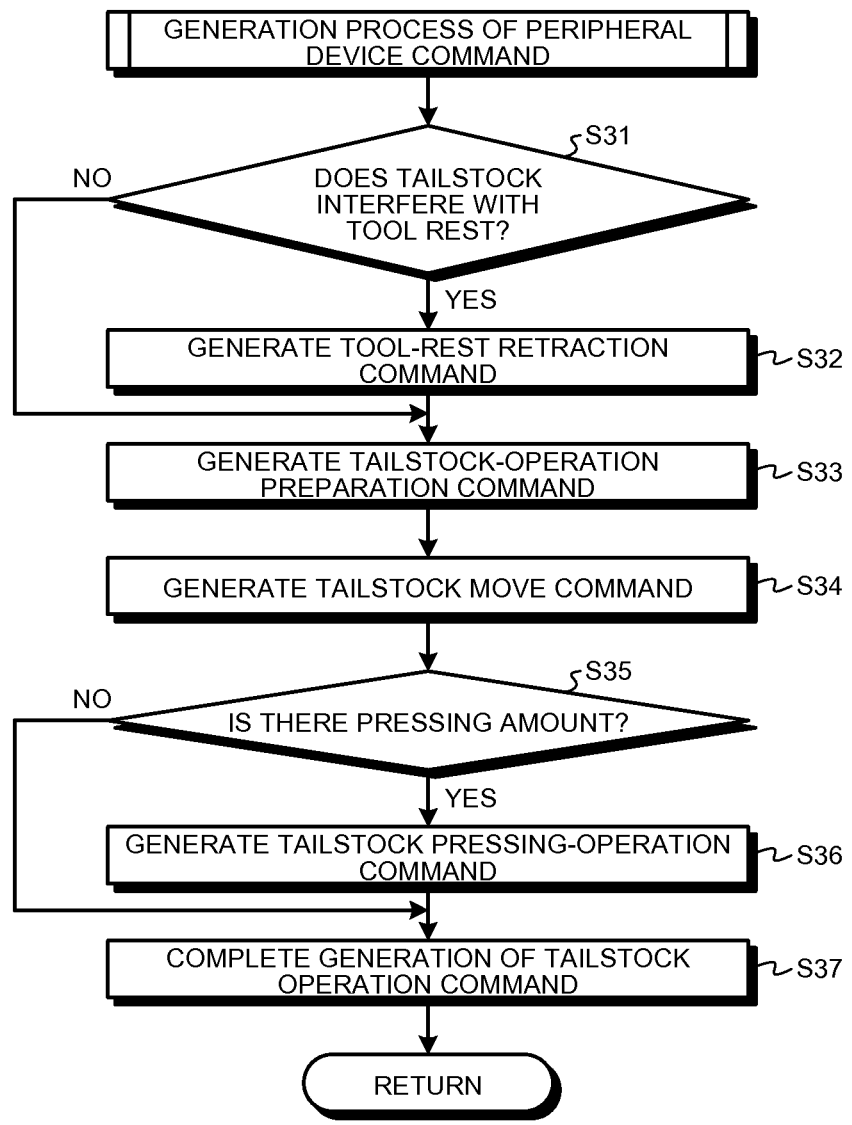
FIG. 9 is a flowchart illustrating an example of a generation process procedure of a peripheral device command in the case of an NC device including a tailstock.

FIG. 9 is a flowchart illustrating an example of a generation process procedure of the peripheral device command in the case of the NC device including the tailstock. It is assumed here that a command for the peripheral device, "G305 L1 K100", is input as a program as illustrated in (b) in FIG. 3. It is also assumed that the operation pattern illustrated in the operation "1" in FIG. 5 is acquired in step S13 in FIG. 8 and that "100" is set as the moving amount.

In the operation pattern "1" in FIG. 5, an interference determination as to whether the tailstock interferes with the tool rest when the tailstock is moved is performed first (Step S31). When it is determined that the tailstock interferes with the tool rest (YES in step S31), a tool-rest retraction command is generated (Step S32). Specifically, the tool-rest retraction command is expressed as the following expression (1-1).

$$\text{G90G0X[retraction position X]Y[retraction position Y]Z[retraction position Z]} \quad (1\text{-}1)$$

The [retraction position X], [retraction position Y], and [retraction position Z], which are variable names in the expression (1-1), are acquired from the operation information in the operation-information storage unit 13 in FIG. 6. Because the retraction position X is "100.", the retraction position Y is "0.", and the retraction position Z is "100." according to FIG. 6, the expression (1-1) is rewritten as an expression (1-2) by substituting these values for the expression (1-1).

$$\text{G90G0X100.Y0.Z100.} \quad (1\text{-}2)$$

Thereafter, or alternatively when it is determined in step S31 that the tailstock does not interfere with the tool rest (NO in step S31), a tailstock-operation preparation command next in the operation pattern "1" is generated (Step S33). The tailstock-operation preparation command is expressed as the following expression (2).

$$M5M9 \quad (2)$$

These M codes are commonly specified regardless of users or manufacturers. That is, "M5" indicates stop of the spindle, and "M9" indicates turning-off of a coolant. Because there are no variables in the command, the command of the expression (2) remains unchanged.

Subsequently, a tailstock move command that comes next in the operation pattern "1" is generated (Step S34). In FIG. 5, the tailstock move command is expressed as the following expression (3-1).

$$G90G0[\text{shaft name of peripheral device}][[\text{moving amount}]-[\text{pressing amount}]] \quad (3\text{-}1)$$

The [shaft name of peripheral device] is acquired from the machine information stored in the machine-information storage unit 14, the [pressing amount] is acquired from the operation information stored in the operation-information storage unit 13, and the [moving amount] is acquired from the argument in the command for the peripheral device as variable names in the expression (3-1). The shaft name of the peripheral device is "W" according to FIG. 7, the pressing amount is "1." according to FIG. 6, and the moving amount is "100" according to the argument in the command for the peripheral device. The following expression (3-2) is acquired by substituting these values for the expression (3-1).

$$G90G0W99. \quad (3\text{-}2)$$

Subsequently, a pressing determination as to whether there is a pressing amount is performed (Step S35). The determination of the pressing amount is performed by acquiring the pressing amount in the operation information stored in the operation-information storage unit 13. Because the pressing amount is "1." according to FIG. 6, there is a pressing amount in this example.

When there is a pressing amount (YES in step S35), a tailstock pressing-operation command is generated (Step S36). According to FIG. 5, the tailstock pressing-operation command is expressed as the following expression (4-1).

$$G31[\text{shaft name of peripheral device}][\text{pressing amount}]M[\text{thrust(high)}]M[\text{thrust ON}]F \quad (4\text{-}1)$$

The [shaft name of peripheral device], [thrust (high)], and [thrust ON] are acquired from the machine information stored in the machine-information storage unit 14, and the [pressing amount] is acquired from the operation information stored in the operation-information storage unit 13 as the variable names in the expression (4-1). According to FIG. 7, the shaft name of the peripheral device is "W", the thrust (high) is "831", and the thrust ON is "504". According to FIG. 6, the pressing amount is "1.". The following expression (4-2) is acquired by substituting these values for the expression (4-1).

$$G31W1.M831M504F \quad (4\text{-}2)$$

Figures 10, 11:
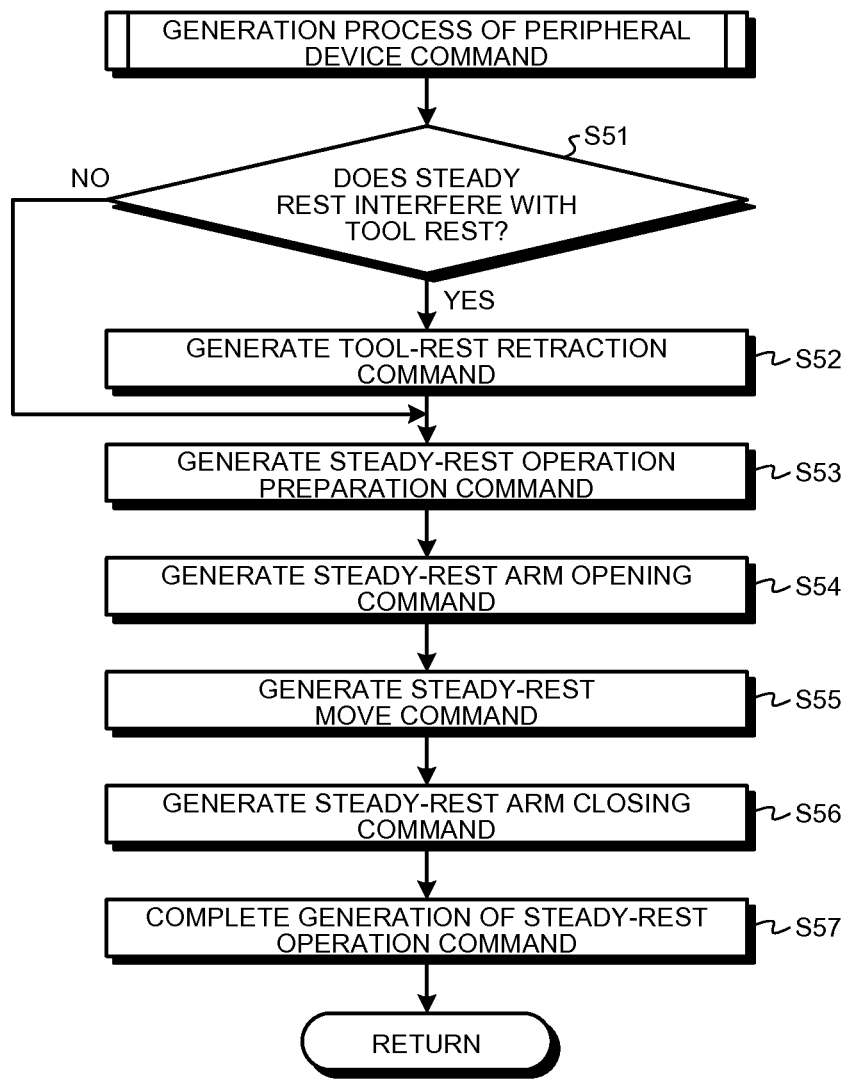
FIG. 10 is a diagram illustrating a peripheral device command for the NC device including the tailstock.
FIG. 11 is a flowchart illustrating an example of the generation process procedure of a peripheral device command in the case of an NC device including a steady rest.

Thereafter, or alternatively when there is no pressing amount in step S35 (NO in step S35), the operation pattern having the expressions (1-2), (2), (3-2), and (4-2) is designated as the peripheral device command, whereby the generation process of the peripheral device command ends. FIG. 10 is a diagram illustrating the peripheral device command for the NC device including the tailstock. Thereafter, the process returns to FIG. 8.

FIG. 11 is a flowchart illustrating an example of a generation process procedure of the peripheral device command in the case of the NC device including the steady rest. It is assumed here that a program expressed by the following expression (5) is input as a command for the peripheral device.

$$G305\ L2\ K100 \quad (5)$$

It is assumed that the operation pattern indicated by the operation "2" in FIG. 5 is acquired in step S13 in FIG. 8 and that "100" is set as the moving amount.

In the operation pattern "2" in FIG. 5, an interference determination as to whether the steady rest interferes with the tool rest when the steady rest is moved is performed first (Step S51). When it is determined that the steady rest interferes with the tool rest (YES in step S51), a tool-rest retraction command is generated (Step S52). Specifically, the tool-rest retraction command is expressed as the following expression (6-1).

$$G90G0X[\text{retraction position X}]Y[\text{retraction position Y}]Z[\text{retraction position Z}] \quad (6\text{-}1)$$

The [retraction position X], [retraction position Y], and [retraction position Z], which are variable names in the expression (6-1), are acquired from the operation information in the operation-information storage unit 13 in FIG. 6. Because the retraction position X is "100.", the retraction position Y is "0.", and the retraction position Z is "100." according to FIG. 6, the expression (6-1) is rewritten to be an expression (6-2) by substituting these values for the expression (6-1).

$$G90G0X100.Y0.Z100. \quad (6\text{-}2)$$

Thereafter, or alternatively when it is determined in step S51 that the steady rest does not interfere with the tool rest (NO in step S51), a steady-rest operation preparation command that comes next in the operation pattern "2" is generated (Step S53). The steady-rest operation preparation command is expressed as the following expression (7).

$$M5M9 \quad (7)$$

These M codes are commonly specified regardless of users or manufacturers. That is, "M5" indicates stop of the spindle, and "M9" indicates turning-off of the coolant. Because there is no variable in the command, the command of the expression (7) remains unchanged.

Subsequently, a steady-rest arm opening command that comes next in the operation pattern is generated (Step S54). According to FIG. 5, the steady-rest arm opening command is expressed as the following expression (8-1).

$$M[\text{steady-rest arm opening command}] \quad (8\text{-}1)$$

The [steady-rest arm opening command], which is the variable name in the expression (8-1), is acquired from the machine information stored in the machine-information storage unit 14. Because the steady-rest arm opening command is "292" according to FIG. 7, the following expression (8-2) is acquired by substituting the value for the expression (8-1).

$$M292 \quad (8\text{-}2)$$

Subsequently, a steady-rest move command that comes next in the operation pattern is generated (Step S55). According to FIG. 5, the steady-rest move command is expressed as the following expression (9-1).

$$G90G0[\text{shaft name of peripheral device}][\text{moving amount}] \quad (9\text{-}1)$$

The [shaft name of peripheral device] is acquired from the machine information stored in the machine-information storage unit 14, and the [moving amount] is acquired from the argument in the command for the peripheral device as variable names in the expression (9-1). The shaft name of the peripheral device is "W" according to FIG. 7, and the moving amount is "100" according to the argument in the command for the peripheral device. The following expression (9-2) is acquired by substituting these values for the expression (9-1).

G90G0W100.　　　　　　　　　　　　　(9-2)

Thereafter, a steady-rest arm clamping command that comes next in the operation pattern is generated (Step S56). According to FIG. 5, the steady-rest arm clamping command is expressed as the following expression (10-1).

M[steady-rest arm clamping command]　　(10-1)

The [steady-rest arm clamping command], which is a variable name in the expression (10-1), is acquired from the machine information stored in the machine-information storage unit 14. Because the steady-rest arm clamping command is "293" according to FIG. 7, the following expression (10-2) is acquired by substituting the value for the expression (10-1).

M293　　　　　　　　　　　　　　　　(10-2)

Subsequently, the operation pattern having the expressions (6-2), (7), (8-2), (9-2), and (10-2) is designated as the peripheral device command, whereby the generation process of the peripheral device command ends. FIG. 12 is a diagram illustrating the peripheral device command for the NC device including the steady rest. Thereafter, the process returns to FIG. 8.

According to the present embodiment, the operation-pattern storage unit 11 that defines the operation patterns in each of which portions that vary according to the configuration of the NC machine tool in commands related to each peripheral device are expressed as variables, the machine-information storage unit 14 that stores therein machine information in which a shaft name defined for each machine configuration and an uniquely defined M code are associated with the variables, and the operation-information storage unit 13 in which predetermined operations in the operation pattern and the variables are associated with each other are provided. The commands for the peripheral device are each defined by an argument indicating the operation pattern and the argument indicating the moving amount. When having determined that a command is directed to a peripheral device, the program analysis unit acquires an operation pattern indicated by the argument from the operation-pattern storage unit 11, and delivers the operation pattern to the peripheral-device operation generation unit 15 together with a moving amount indicated by the argument. The peripheral-device operation generation unit 15 substitutes values acquired from the acquired moving amount, the operation information stored in the operation-information storage unit 13, or the machine information stored in the machine-information storage unit 14 for the variables in the operation pattern, thereby generating a peripheral device command, and delivers the generated peripheral device command to the NC control unit 16. Consequently, a user only needs to designate the operation pattern to be operated by the peripheral device and the moving amount to automatically generate the peripheral device command for controlling the peripheral device, thereby enabling to control the peripheral device. Further, the user does not need to pay attention to the shaft name, the M code, or the command sequence that is conventionally programmed by the user, thereby enabling easy programming and easy control of the peripheral device. As a result, the program creation time can be reduced.

INDUSTRIAL APPLICABILITY

As described above, the numerical control device according to the present invention is useful as a numerical control device including a peripheral device around a machine tool.

REFERENCE SIGNS LIST 1 spindle, 2 workpiece, 3 tailstock, 4 shaft, 5 tool rest, 6 tool, 7 stead rest, 10 NC device, 11 operation-pattern storage unit, 12 program analysis unit, 13 operation-information storage unit, 14 machine-information storage unit, 15 peripheral-device operation generation unit, 16 NC control unit, 17 servo control unit, 100 NC program.

The invention claimed is:

1. A numerical control device that controls a machine tool and a peripheral device to be placed around the machine tool according to a numerical control program, the numerical control device comprising:

at least one memory which stores operation patterns each including commands for causing operations by the peripheral device to be executed, the commands using configuration of a shaft of the peripheral device, M code unique to the numerical control device, or moving amount of the peripheral device as variables, and which stores machine information in which a value with respect to each of the variables is specified for the shaft of the peripheral device or for the unique M code;

a processor that receives the numerical control program, and when a command in the numerical control program is a command for the machine tool, delivers the command to a numerical controller, and when the command is a command for the peripheral device including a first argument indicating an operation pattern stored in the memory and a second argument indicating a moving amount of the peripheral device, acquires the operation pattern corresponding to the first argument from the memory, and delivers the operation pattern to a peripheral-device controller together with the moving amount indicated by the second argument;

wherein the peripheral-device controller generates a peripheral device command by substituting the corresponding machine information or the acquired moving amount for each of the variables in the commands constituting the acquired operation pattern, wherein, the numerical controller that generates a move command with respect to the machine tool or the shaft constituting the peripheral device from a command in the numerical control program or the peripheral device command, wherein the memory further stores operation information specifying operations of the peripheral device or a constituent member of the machine tool that is located at a position interfering with the peripheral device, wherein the variables in the operation patterns further include operations with respect to the peripheral device or the constituent member of the machine tool that is located at a position interfering with the peripheral device, and wherein the peripheral-device controller substitutes the corresponding machine information, the acquired moving amount, or the corresponding operation information for each of the variables in the commands constituting the operation patterns, to generate the peripheral device command.

2. The numerical control device according to claim 1, wherein the operation patterns are defined by a user of the numerical control device for arbitrary operation processing using the peripheral device.

3. The numerical control device according to claim 1, wherein the operation patterns include commands for performing determination of interference between a tool rest that constitutes the machine tool and the peripheral device at the time of operating the peripheral device and causing the tool rest to retract when the interference is expected.

4. A non-transitory computer readable medium storing instructions to be executed by a numerical control device, which controls a machine tool and at least one peripheral device placed around the machine tool, wherein the instructions when executed by the numerical control device cause the numerical control device to implement the following operations:
- store operation patterns each including commands for causing operations by the peripheral device to be executed, the commands using configuration of a shaft of the peripheral device, M code unique to the numerical control device, or moving amount of the peripheral device as variables;
- store machine information in which a value with respect to each of the variables is specified for the shaft of the peripheral device or for the unique M code;
- receive a numerical control program which is executed by the numerical control device to control the machine tool via a first controller and the at least one peripheral device via a second controller,
- when a command in the numerical control program is a command for the machine tool, deliver the command to the first controller, and
- when the command is a command for the peripheral device including a first argument indicating an operation pattern from among the stored operation patterns and a second argument indicating a moving amount of the peripheral device, acquires the operation pattern corresponding to the first argument from the stored operation patterns, and delivers the operation pattern to the second controller together with the moving amount indicated by the second argument, wherein the second controller generates a peripheral device command by substituting the corresponding machine information or the acquired moving amount for each of the variables in the commands constituting the acquired operation pattern, and wherein the first controller generates a move command with respect to the machine tool or the shaft constituting the peripheral device from a command in the numerical control program or the peripheral device command, wherein the instructions further comprise store operation information specifying operations of the peripheral device or a constituent member of the machine tool that is located at a position interfering with the peripheral device, wherein the variables in the operation patterns further include operations with respect to the peripheral device or the constituent member of the machine tool that is located at a position interfering with the peripheral device, and wherein the second controller substitutes the corresponding machine information, the acquired moving amount, or the corresponding operation information for each of the variables in the commands constituting the operation patterns, to generate the peripheral device command.

5. The non-transitory computer readable medium of claim 4, wherein the operation patterns are defined by a user of the numerical control device for arbitrary operation processing using the peripheral device.

6. The non-transitory computer readable medium of claim 4, wherein the operation patterns include commands for performing determination of interference between a tool rest that constitutes the machine tool and the peripheral device at the time of operating the peripheral device and causing the tool rest to retract when the interference is expected.

* * * * *